United States Patent [19]

Summers

[11] Patent Number: 4,483,513

[45] Date of Patent: Nov. 20, 1984

[54] PIN CONNECTION OF A SHAFT TO CLOSURE MEMBER OF A ROTARY VALVE

[75] Inventor: Anthony C. Summers, St. Cloud, Minn.

[73] Assignee: General Signal Corporation, Stamford, Conn.

[21] Appl. No.: 406,344

[22] Filed: Aug. 9, 1982

[51] Int. Cl.³ .............................................. F16K 1/22
[52] U.S. Cl. ................................... 251/308; 251/315; 403/362
[58] Field of Search ................ 251/308, 315; 403/362

[56] References Cited

U.S. PATENT DOCUMENTS

| | | | |
|---|---|---|---|
| 349,005 | 9/1886 | Sargent | 403/362 |
| 473,818 | 4/1892 | Binns | 403/362 |
| 3,373,658 | 3/1968 | Larsen | 403/362 |
| 3,946,752 | 3/1976 | Yamamoto . | |
| 4,037,819 | 3/1977 | Kindersley . | |
| 4,399,977 | 8/1983 | Wheatley | 251/315 |

Primary Examiner—Martin P. Schwadron
Assistant Examiner—James R. Shay
Attorney, Agent, or Firm—Barnes & Thornburg

[57] ABSTRACT

In a pin connection of a shaft to a closure member on a rotary valve, the recesses in the shaft which receive the pins are shaped such that one of a pair of pins are placed in compression versus shear for rotation of the shaft in a respective direction.

12 Claims, 11 Drawing Figures

PIN CONNECTION OF A SHAFT TO CLOSURE MEMBER OF A ROTARY VALVE

BACKGROUND OF THE INVENTION

The present invention relates generally to rotary valves and, more specifically, to an improved pin connection of the shaft to the closure member of a rotary valve.

Butterfly valves generally include a disc pivotably connected to the body of the valve by one or more shafts. The shafts are received in the center of the disc on a special hub which is generally integral with the valve. The hubs are either on the backside or the center of the disc. Since it is generally desirable for the disc to be removable from the housing, pins which traverse the disc and the shaft removably secure the shaft to the disc.

One prior art method of securing the shaft to the disc using a pin is illustrated in FIG. 1. The disc 10 receives a shaft 12 and includes a pin 14 threadably received in the disc 10. The longitudinal axis of the pin 14 intersects the longitudinal axis of the shaft 12. Depending upon the size of the shaft and the load anticipated, a pair of pins 14 may be displaced along the axis of the shaft 12 to secure the shaft to the disc. When the shaft and the disc are placed under a torquing load relative to each other from the fluid or the opening and closing motion of the valve, the pin 14 is placed under a shear force. Thus, the pin 14 must be of a given size to operate efficiently under such shear force.

Another prior art method of securing the disc and shaft is illustrated in FIG. 2 and includes a disc 20, a shaft 22 and a pin 24. As can be seen, the pin 24 has its longitudinal axis transverse to the longitudinal axis of the shaft 22. This arrangement in effect is like a cotter pin. As in the prior art assembly of FIG. 1, the assembly of FIG. 2 places the pin 24 under a shear stress when the shaft 22 attempts to rotate relative to the disc 20.

In both prior art assemblies of FIGS. 1 and 2, the opening in the shafts 12 and 22 as well as in the discs 10 and 20 will wear thus there will be a delay or hysteresis effect between the rotation of the shaft and the discs. This is highly undesirable. Merely tightening the pins 14 and 24 will not adjust for this wear of the elements. Thus, there exists the need for a pin connection of a shaft to a disc which is not susceptible to shear forces when the elements are placed under torque and which is adjustable for wear of the elements.

SUMMARY OF THE INVENTION

An object of the present invention is to provide an improved pin connection of a shaft to a closure member on a rotary valve.

Another object of the present invention is to provide a pin connection of a shaft to a disc where the pin is not under a shear load when the assembly is under torque.

Still another object of the present invention is to provide a pin connection for a shaft to a closure member which is adjustable for wear of the elements.

These and other objects of the invention are attained by forming novel pin receiving recess in the shaft wherein each of a pair of pins are placed under compression due to the rotational torque of the shaft relative to the disc in one direction of rotation instead of shear force which is experienced only by the threads of the pins. The recess may have one lateral wall sufficiently displaced form the other such that the other wall does not engage the pin when the shaft rotates the engaging lateral wall away from the pin. The bottom of the recess versus one of the lateral walls engages the pin and moves the pin along its longitudinal axis to thereby place it under compression with the upper end being threaded into an aperture in the disc. For the opposite direction of rotation, the other pin is placed under compression versus shear engagement of the pin with the bottom of the recess in the shaft. The recess in the shaft may be cut such that there is no opposing lateral wall or that the lateral wall is coincident with the bottom of the recess. The longitudinal axis of a pair of pins may be parallel to each other and not intersect the longitudinal axis of the shaft. Alternatively, the longitudinal axis of the pins may intersect the longitudinal axis of the shaft. Preferably, the pins lie in the same plane orthogonal to the longitudinal axis of the shaft.

Other objects, advantages and novel features of the present invention will become apparent from the following detailed description of the invention when considered in conjunction with the accompanying drawings.

DESCRIPTION OF THE PREFERRRED EMBODIMENTS

Figure 1:
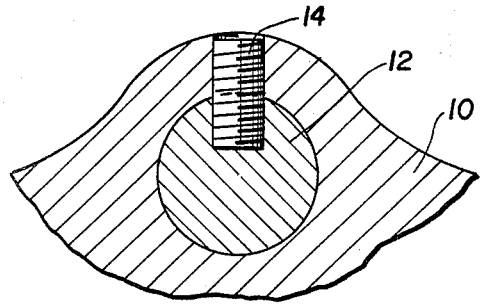
FIG. 1 is a cross-sectional view of a pin connection for a shaft-to-disc of a butterfly valve.
Figure 2:
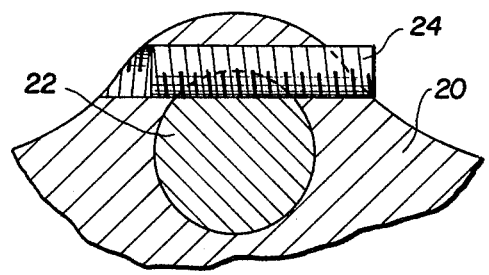
FIG. 2 is a cross-sectional view of another prior art pin connection of a shaft to a disc on a butterfly valve.
Figure 3:
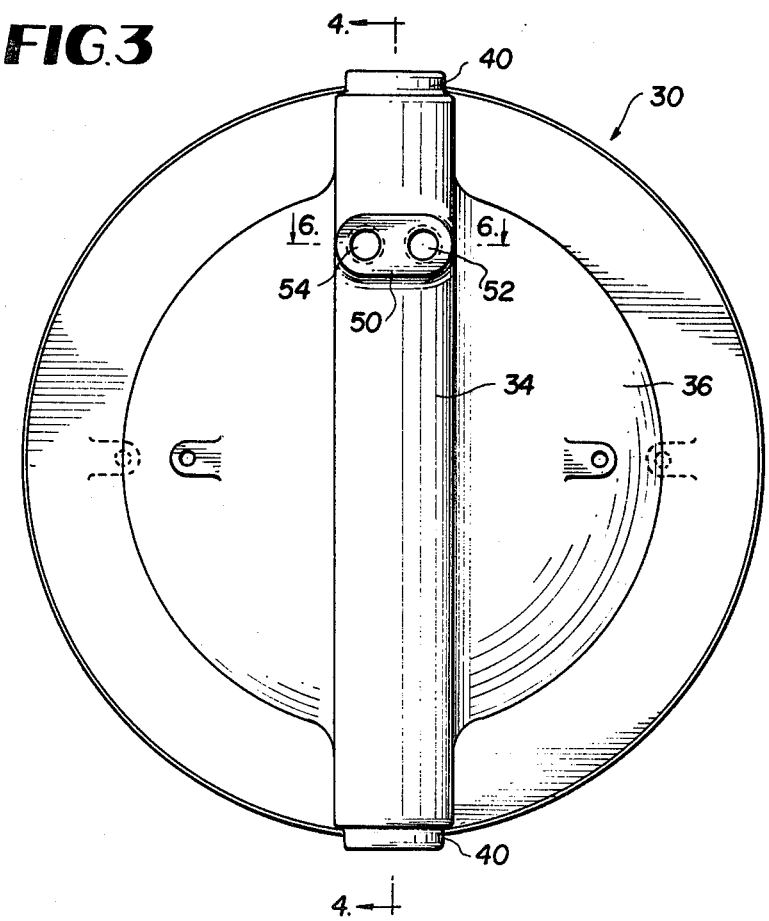
FIG. 3 is a back view of a disc incorporating the principles of the present invention.
Figure 4:
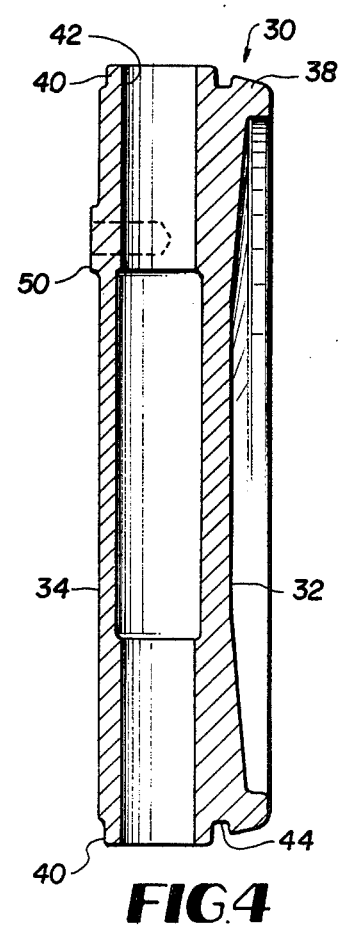
FIG. 4 is a cross-sectional view taken along lines IV—IV of FIG. 3.
Figure 5:
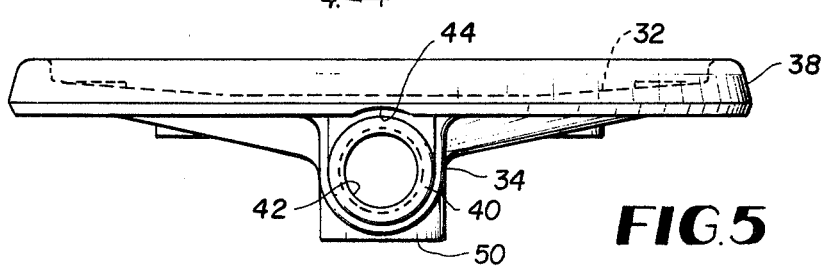
FIG. 5 is a top view of the disc of FIG. 5.

A disc or closure member 30 incorporating the principles of the present invention is illustrated in FIGS. 3, 4 and 5 as having a front face 32 and a hub 34 integrally extending from the back face 36. Hub 34 is illustrated as a single continuous hub to receive a single shaft to rotatably mount the disc 30 to a valve housing. The front face 32 includes a circumferential rim 38 which engages a corresponding portion of the housing to form a seal therewith. The edge of the circumferential rim 38 may be coated with Teflon for high performance environments.

The hub 34 is illustrated as being offset relative to the sealing portion of the valve and includes a pair of hub extensions 40 one at each end extending beyond the diameter of the disc 30. These extensions reduce the size of the disc locator which is generally received between the hub 34 and the housing. By using the hub extensions 40, the size of the disc locator is minimized thereby minimizing the portion of the shaft which is not received in opening 42 of the hub 34 and, consequently, minimizes the bending moment of the shaft. As illustrated in FIGS. 4 and 5, the disc itself is undercut at 44 to allow clearance of the connection of the disc to the valve housing.

Figure 6:
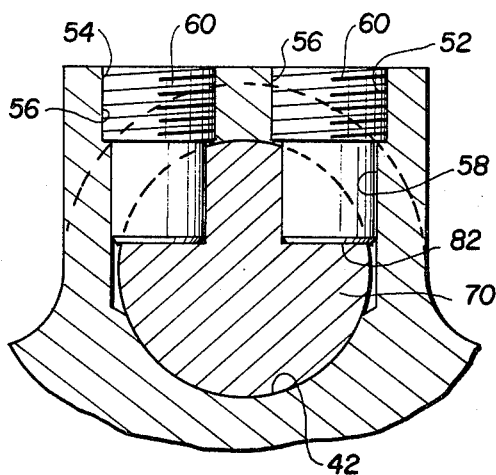
FIG. 6 is a cross-sectional view of the hub portion of the disc of FIG. 3 taken along the lines VI—VI with a shaft and pins.
Figure 8:
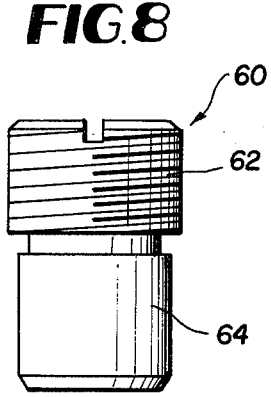
FIG. 8 is a side view of a pin according to the principles of the present invention.

The hub 34 includes a boss portion 50 having a pair of threaded apertures 52 and 54. As illustrated in FIG. 6, the apertures 52 and 54 in the boss include an upper portion 56 which is threaded and an unthreaded lower portion 58. A pair of pins 60 threadedly received in the apertures 52 and 54 and as specifically shown in FIG. 8 also included upper threaded portions 62 and lower unthreaded portions 64.

Figure 7:
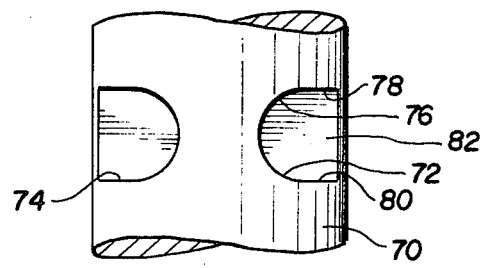
FIG. 7 is a partial exploded view of the recess in the shaft of FIG. 3.

As illustrated in FIGS. 6 and 7, a shaft 70 is received in bore 42 of hub 34. Recesses 72 and 74 are provided in the shaft 70, and have a generally U-shaped cross-sectional area as illustrated in FIG. 7. The U includes a first lateral wall portion 76 which is the bite of the U or semicircular and straight leg portions 78 and 80 extending therefrom. The recesses 72 and 74 each include a bottom wall 82 perpendicular to the U-shaped lateral walls 76, 78 and 80. It should be noted that there is no lateral portion opposed the semicircular portions 76. As seen from FIG. 7, semicircular portions 76 of recesses 74 and 72 are opposed to each other and the U-shaped cross-sections are open in opposite directions. With the pins 60 threadably received in openings 52 and 54, they extend into the recesses 72 and 74. The radius of curvature of the semicircular portion of 76 is substantially the radius of curvature of the circular apertures 52 and 54 in the boss 50 and their center line is coincident such that the semicircular portions 76 are aligned with the superimposed portions of openings 52 and 54. The lateral edge oppose the semicircular portions 76 of the recesses 72, 74, since they do not exist, extend beyond the corresponding opposed edge of apertures 52 and 54 of the boss 50.

Specially shaped recesses 72 and 74 in the shaft 70 allow the pins 60 to be placed in compression versus shear when the shaft 70 rotates relative to the disc. The pins 60 are inserted through the apertures 52 and 54 in the boss 50 and engage the bottom 82 of the recesses 72 and 74 in the shaft 70. When the shaft 70 rotates clockwise in FIG. 6 relative to the boss 50, the bottom wall 82 of recess 74 presses against the bottom of pins 60 placing it in compression against the threaded portion 56 of the aperture 54. Since there is no lateral wall in the counterclockwise direction from the pin there is no wall to place the pins 60 in aperture 54 and recess 74 in shear. Although pins 60 in aperture 52 and recess 72 may be placed under a small shear force, this is small compared to the shear force of the prior art pin connections. When the shaft 70 is rotated in the opposite direction relative to the boss 50, pins 60 in aperture 52 and recess 72 is placed in compression when the bottom wall 82 forces the pins 60 along its longitudinal axis. Pin 60 and aperture 54 and recess 74 may be placed under a small shear force. Since the forces on the pin 60 are along the longitudinal axis and they are placed in compression versus under shear, any wear due to the operation may be compensated by further tightening the pins 60 so that they firmly engage the bottoms 82 of the recesses 72 and 74.

Although the axis of apertures 52 and 54 and recesses 72 and 74 have been shown to be parallel to each other and symmetrical about and offset with respect to the longitudinal axis of the shaft 70, other designs may be used. Also, even though they are shown in a single plane, the apertures and recesses may be in different planes. The important distinction is that the non-adjacent walls of the recesses 72 and 74 be sufficiently displaced from the pins such that they do not place the pin under shear force when the shaft is rotated with the adjacent lateral wall away from the pin.

Figure 9:
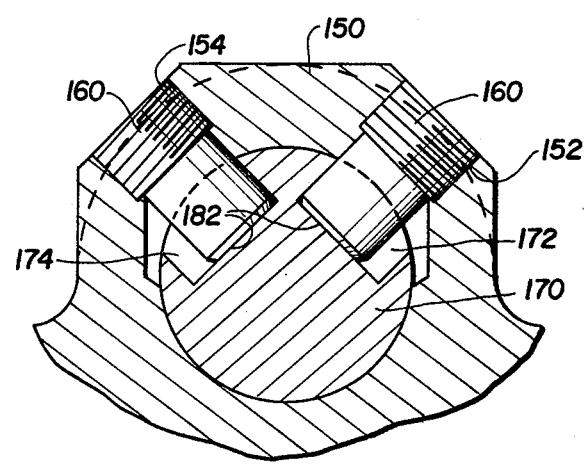
FIG. 9 is a partial cross-sectional view similar to FIG. 6 of another embodiment of the present invention.
Figure 10:
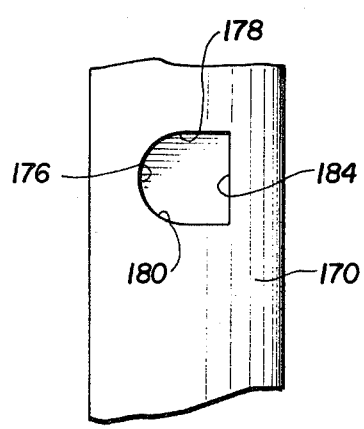
FIG. 10 is a partial exploded view of the recess in the shaft of FIG. 9.

A modified embodiment illustrating the principle is shown in FIG. 9. The shaft 170 is shown as having a pair of recesses 172 and 174 therein. The boss 150 also has a pair of corresponding recesses 152 and 154 therein. A pair of pins 160 are threadably received in recesses 152 and 154 and extend to the bottom walls 182 of recesses 172 and 174. As illustrated in FIG. 10, the recesses 172 and 174 also have U-shaped cross-sections with a curved semicircular 176, extending legs 178 and 180 and a flat wall 184 opposed the semicircular curved section 176. As shown in FIG. 9, the opposed flat wall 184 is displaced from the curved portion 176 a greater distance than the diameter of the pin 160 and the diameter of the apertures 152 and 154.

As discussed in reference to FIG. 6, the importance is that the wall opposed the curved section 176 or the adjacent walls of the recesses 172 and 174 are sufficiently displaced from the curved walls 176 such that one of the pins 160 under compression not shear for each direction of rotation. Another difference between the embodiment of FIG. 9 compared to that of FIG. 6 is that the axis of the pins 160, the apertures 152 and 154 are non-parallel and substantially intersect the longitudinal axis of the shaft 170. Although the wall 184 of the recesses 172 and 174 is shown as flat, other shapes may be formed as long as the wall is sufficiently displaced such that it does not engage the edge of the pin 160.

Figure 11:
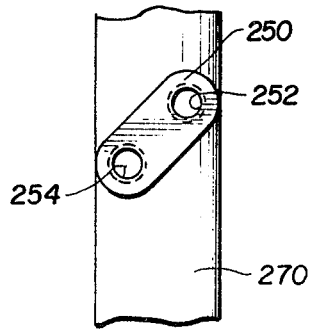
FIG. 11 is a partial side view of a hub portion of a disc of another embodiment of the present invention.

Whereas FIG. 6 shows the pins' axis being parallel to each other and not intersecting the axis of the shaft and FIG. 9 shows the pins' axis intersecting the axis of the shaft, the axis of the pins may form any angle with the axis of the shaft. Similarly, the pins need not line in the plane orthogonal to the axis of the shaft. As illustrated in FIG. 11, the pin apertures 252 and 254 in boss 250 are in a plane non-orthogonal to the axis of shaft 270.

Although the invention has been described and illustrated in detail, it is clearly understood that the same is by way of illustration and example only and is not to be taken by way of limitation. The principle is equally applicably to split shaft butterfly valves, ball valves and other rotary valves as well as the illustrated single shaft valve. The spirit and scope of the present invention are to be limited only by the terms of the appended claims.

What is claimed is:

1. In a rotary valve having a closure member, at least one bore in said closure member, a shaft in said bore for rotatably mounting said closure member to a valve housing and a pin extending from said closure member into said shaft to secure said closure member to said shaft, the improvement comprising:
    a pair of threaded apertures in said closure member;
    a pair of recesses in said shaft each aligned with a corresponding aperture in said closure member;
    a pair of pins threadably received in a respective closure member aperture and extending into a corresponding shaft recess;
    said shaft recesses being dimensioned to place one of said pins under compression along the axis of said one pin and the other of pins under shear for clockwise rotation and said other pin under compression along the axis of said other pin and said one pin under shear for counterclockwise rotation.

2. The rotary valve according to claim 1, wherein each of said shaft recesses each include a first lateral wall substantially aligned with a lateral wall of a corresponding closure member aperture and an opposed lateral wall circumferentially spaced a greater distance than the corresponding opposed lateral wall of said closure member apertures for placing a pin under shear when said shaft rotates said first lateral wall toward said pin.

3. The rotary valve according to claim 2, wherein said recess each include a bottom surface for engaging the bottom of said pin and placing said pin under compression when said shaft rotates said first lateral wall away from said pin.

4. The rotary valve according to claim 1, wherein said pair of closure member aperatures, shaft recesses and pins are in a single plane orthogonal to the axis of said shaft.

5. A rotary valve according to claim 4, wherein the axis of said pins are parallel.

6. A rotary valve according to claim 5, wherein the axis of said pins are symmetrical about the axis of said shaft.

7. A rotary valve according to claim 1, wherein said shaft recesses each include a first lateral wall substantially aligned with a lateral wall of a corresponding closure member aperture for placing a pin under shear when said shaft rotates said first lateral wall toward said pin and a bottom surface extending to the exterior of said shaft to form an opposed circumferential wall spaced a greater distance than the corresponding opposed lateral wall of said closure member aperture.

8. A rotary valve according to claim 7, wherein said bottom surface is at a depth capable of engaging the bottom of said pin for placing said pin under compression when said shaft rotates said first lateral wall away from said pin.

9. A rotary valve according to claim 1, wherein said pins are threaded only along the portion received in said closure member aperture.

10. A rotary valve according to claim 1, wherein said valve is a butterfly valve and said closure member is disc shaped.

11. A rotary valve according to claim 1, wherein said valve is a ball valve and said closure member is ball shaped.

12. A rotary valve according to claim 1 wherein said pins have a flat end and a substantially uniform cross-section.

* * * * *